UNITED STATES PATENT OFFICE.

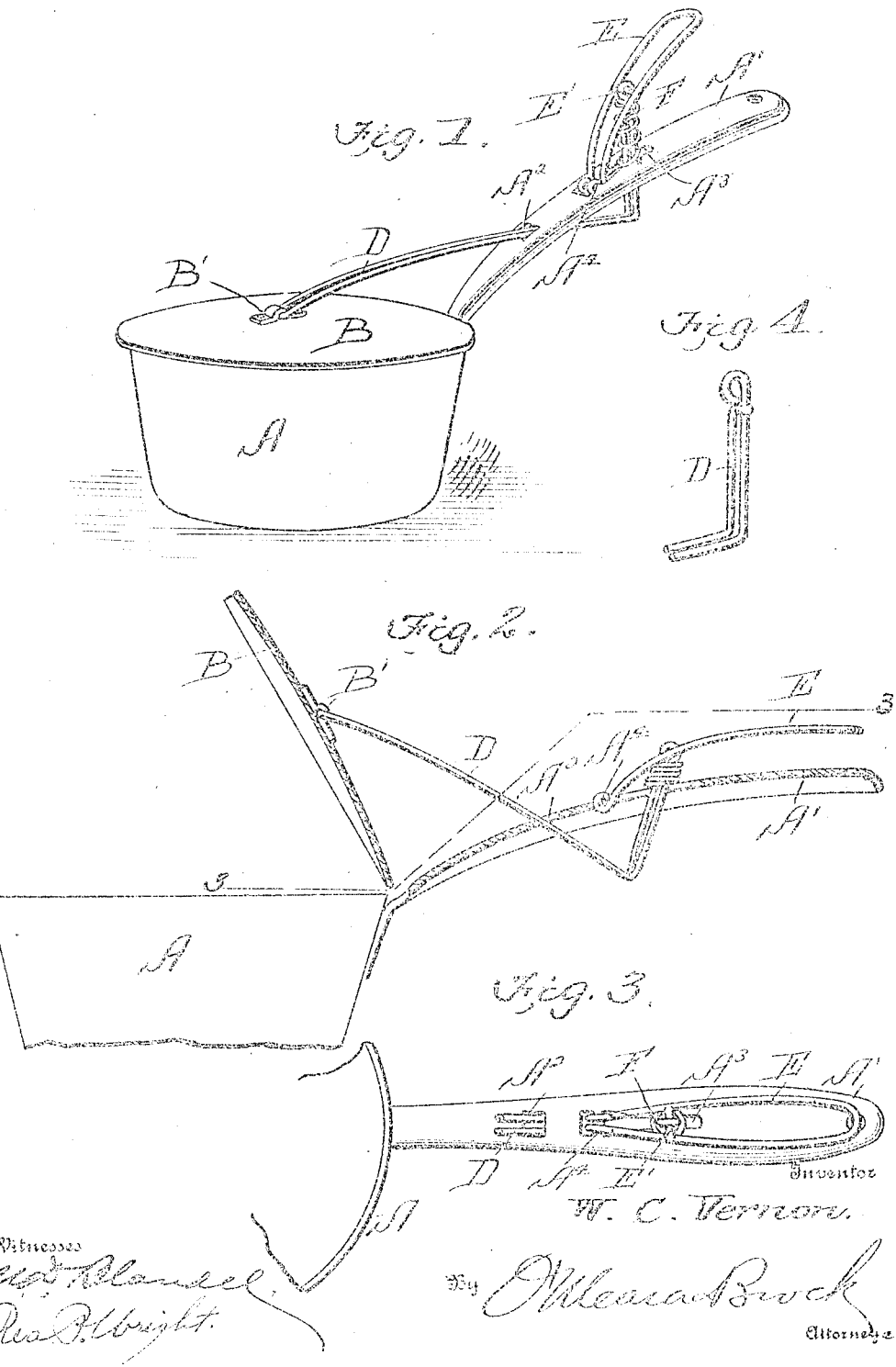

WALTER C VERNON, OF COLUMBUS, OHIO.

LID FOR PANS.

No. 851,969.　　　Specification of Letters Patent.　　　Patented April 30, 1907.

Application filed August 14, 1906. Serial No. 330,598.

*To all whom it may concern:*

Be it known that I, WALTER C. VERNON, a citizen of the United States, residing at Columbus, in the county of Franklin and State of Ohio, have invented a new and useful Improvement in Lids for Pans, of which the following is a specification.

This invention relates to lid for pans and more particularly to hinged lids for sauce-pans and the like, the object being to connect the lid to the handle so that the lid can be readily raised and lowered from the handle of the pan.

With this and various other objects in view, the invention consists in the novel features of construction, combination and arrangement of parts, hereinafter fully described and pointed out in the claims.

In the drawings forming a part of this specification:—Figure 1 is a perspective view of a pan showing my improved lid in place. Fig. 2 is a longitudinal sectional view of the same showing the pan partly broken away. Fig. 3 is a detail top plan view of the handle and a portion of the pan. Fig. 4 is a detail view of the wire showing the manner of attaching it to the lever.

In the drawing A indicates an ordinary sauce-pan provided with the usual handle A' and top B. A plate B' bent to form an eye is secured centrally on the top of the B, through which a wire D passes, which is bent back upon itself and passes through an opening $A^2$, in the handle. The ends of the wire are then bent at right angles adjacent their ends, and extend up through a slot $A^3$, in the handle, one end being looped around the other end and the other end being bent around a cross bar E' of a wire lever E, the ends of which are bent around a cross-bar $A^4$, extending across the slot $A^3$.

A coil-spring F surrounds the ends of the wire between the handle and lever so that the lever will be forced up so as to hold the lid down on the pan.

From the foregoing description it will be readily seen that by grasping the handle and pressing down on the lever, the top will be raised and that by releasing the lever, the spring will close the lid on the pan.

Having thus fully described my invention, what I claim as new and desire to secure by Letters Patent is:—

1. The combination with a pan having a handle, provided with openings, of a wire carrying a lid mounted in said openings and a lever connected to said wire, for the purpose described.

2. The combination with a pan having a rigid handle provided with spaced openings, of an angle-wire slidably mounted in said openings and a lid, and a lever mounted on said handle connected to said wire, for the purpose described.

3. The combination with a pan having a rigid handle provided with spaced openings, of an angled wire slidably mounted in said openings, a lid secured to one end of said wire, and a spring actuated lever pivoted in one of said openings connected to the free end of said wire, for the purpose described.

4. The combination with a pan having a rigid handle provided with spaced openings, of a spring actuated lever mounted in one of said openings, an angled wire slidably mounted in said opening carrying a lid at one end, and connected to the lever at the other end, and a coil-spring surrounding said wire between the handle and the lever.

5. The combination with a pan provided with a rigid handle and having openings formed therein of a lever mounted on said handle and an angled wire carrying a lid extending up through said openings of the handle connected to said lever for the purpose described.

6. The combination with a pan having a rigid handle provided with spaced openings, of a lever mounted on said handle and an angle wire connected to said lever extending through said openings carrying a lid for the purpose described.

7. The combination with a pan having a rigid handle provided with spaced openings, of a lever mounted on a cross-bar extending across one of said openings, an angle-wire connected to said lever extending through said openings carrying a lid and a coil-spring surrounding said wire between said handle and lever, for the purpose described.

WALTER C. VERNON.

Witnesses:
WILLIAM G. KOONS,
WM. M. KOONS.